Dec. 12, 1944.  R. B. PRESSLER  2,364,915
CHANGE SPEED MECHANISM
Filed Jan. 30, 1943

RALPH B. PRESSLER
INVENTOR.

BY Edmund W. E. Kamm
ATTORNEY

Patented Dec. 12, 1944

2,364,915

UNITED STATES PATENT OFFICE 2,364,915

CHANGE-SPEED MECHANISM

Ralph B. Pressler, Fort Wayne, Ind., assignor to S. F. Bowser & Company, Incorporated, Fort Wayne, Ind., a corporation of Indiana Application January 30, 1943, Serial No. 474,156

10 Claims. (Cl. 74—112)

This invention relates to a change speed mechanism. More specifically, it relates to a mechanism which comprises a driving element and a driven element, and means for intermittently accelerating the driven element independently of the driving element, the amount of acceleration being variable depending upon the setting of the accelerating means.

While the uses of this change speed mechanism are varied, it may be used as a calibrating mechanism for a liquid meter having a fixed displacement. In such application the speed changer is connected to be driven by the meter and is connected to drive the register. To effect calibration, the speed changer is adjusted until the fluid delivered corresponds to the quantity indicated on the register.

Another application of the device is in correcting the delivery of a fluid meter in accordance with the temperature. In such application the speed changer may be driven by the meter and may be connected to drive a register, and a thermostat, of a thermostat actuated ratio changing mechanism, may be connected to the adjusting mechanism. In the case of the thermostat alone, the fluid discharged by the meter will be adjusted in volume for the difference in temperature from the standard A. P. I. temperature of 60 degrees Fahrenheit, and in the case of the thermostat driven ratio changing mechanism, the volume of fluid will be adjusted to compensate for both the temperature difference and the coefficient of expansion property of a particular fluid.

An object of the invention is to provide a positive accelerating mechanism which will insure that the same acceleration is attained for the same adjustment each time.

Another object is to provide a positive driving mechanism between the driving and driven shafts.

Yet another object of the invention is to provide a relatively simple and yet rugged mechanism for the purposes indicated above.

Still another object of the invention is to provide a speed changer which has a wide range of adjustment.

These and other objects will become apparent from a consideration of this specification in contion with the drawing which is attached hereto and made a part hereof and in which.

Figure 1:
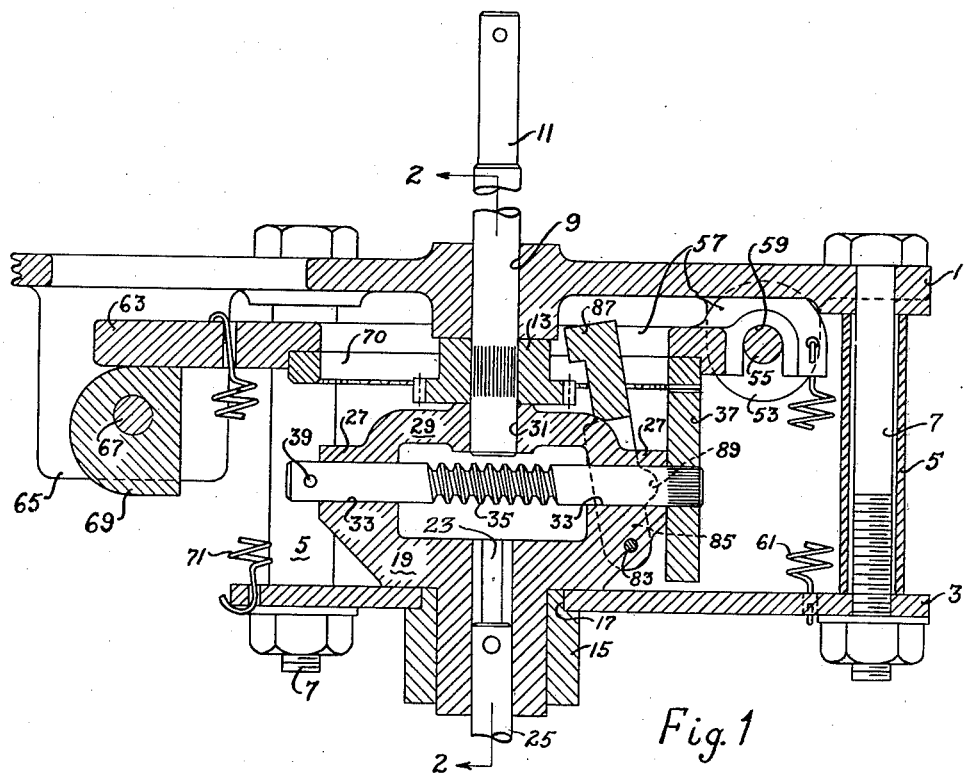
Figure 1 is a sectional view taken on the line 1—1 of Figure 2 showing the brake, acceleration adjustment mechanism and the driving and driven shafts.

Referring now to Figure 1, the numerals 1 and 3 indicate top and bottom plates respectively which are separated by spacers 5 and held together by bolts 7.

Mounted in a bearing 9 in the top plate 1 is the driven shaft 11 which has fixed to it near its lower end the gear 13.

A relatively large bearing 15 is fixed in an opening 17 in the bottom plate and journalled in this bearing is a carrier 19. This carrier is provided with an axial opening 21, having key ways 23, which is adapted to receive the driving shaft 25.

The carrier 19 is provided with two diametrically opposite, vertical arms 27 which are joined at the top by a cross bar 29. The cross bar is provided with a central boss having a bearing opening 31 in which is piloted the lower end of the driven shaft 11.

Journalled in horizontal bearing openings 33 in arms 27 is a worm 35. A gear 37 is fixed to one end of the worm and a pin 39 which passes through the shaft cooperates with the gear to prevent excessive endwise motion of the worm.

The carrier 19 also has formed as a part of it a projecting boss 41 which has fixed in it a vertical stud 43. A hub 45 is adapted to rotate upon the stud and has fixed to its upper end a gear 47 which is adapted to mesh with gear 13 on the driven shaft. Fixed to the lower end of the hub is a worm wheel 49 which meshes with worm 35. A pin 51 prevents excessive end play of the hub.

A pair of lugs 53 depend from the top plate and support a transverse shaft 55. A yoke 57 has downwardly opening bearings 59 which ride upon the ends of the shaft 55 which project beyond the lugs.

A spring 61 is hooked to the bottom plate and to the yoke to the right of the bearing 59 (Fig. 1) and serves to hold the bearing on the shaft.

The yoke 57 is provided with a projection 63 at a point on the side which is remote from the bearings 59. Mounted in lugs 65 which depend from the top plate is an adjusting shaft 67 which carries an adjusting cam 69. The projection 63 rides upon the cam and serves as a cam follower. A spring 71 which is connected to the bottom plate and the yoke, holds the follower 63 on the cam 69.

Figure 2:
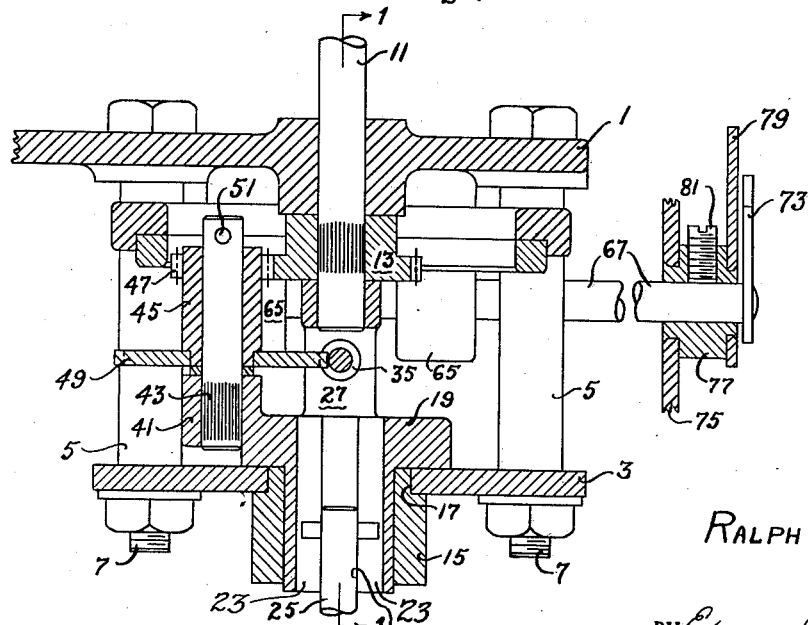
Figure 2 is a sectional view taken on line 2—2 of Figure 1 showing the acceleration mechanism which connects the driving and driven shafts.

As shown in Figure 2, a pointer 73 is mounted on the outer end of shaft 67. A fixed support 15, which may be a part of the bottom plate or a part of equipment to which the bottom plate is attached, carries a bearing 77 which in turn supports an index plate 79. A set screw 81 mounted in the bearing serves to hold the shaft 67, which passes through the bearing, in adjusted position.

An annular or ring gear 70 is fixed centrally upon the yoke and surrounds the shaft 11. The teeth of this gear mesh with the teeth of gear 37. Preferably, the teeth are V-shaped.

Pivotally mounted on the carrier 19 by means of a pin 83 is a yoke 85. The upper or free end of the yoke forms a fly weight 87. A projection 89 is formed on each arm of the yoke and is adapted to ride upon the inner surface of gear 37 under the influence of the weight 87.

While various gear ratios must be used to effect different ranges of adjustment, one set of values which has been used in one application of the device is as follows:

Ring gear 70—140T    Gear 37—70T
Worm 35—Single      Worm gear 49—40T
Gear 47—11T         Gear 13—19T The worm and worm gear must be irreversible.

The cam 69 may also be designed for various effects. The cam here illustrated is provided with a rise of .008 inch for each ten degrees of rotation. The ratio of adjustment of the speed ratio of shaft 11 to shaft 25 with the gearing just described is from a minimum of 1 to 1 to a maximum of 1.0289 to 1. In other words, the shaft 11 can be driven at 2.89% greater speed than shaft 25 with the particular gearing specified. This differential can be increased or decreased by changing the various gear ratio to meet the requirements of any desired application. In one application of the device a 15% change was obtained.

*Operation*

The shaft 25 is rotated by some mechanism such as a meter and drives the carrier 19 at the shaft speed. The gears 49 and 47 revolve about the central axis with the carrier and, if we assume that the gear 37 is stationary, will carry gear 13 and the driven shaft 11 with them so that shaft 11 will be rotated at the same speed as shaft 25.

As shown in the drawing, however, the ring gear 70 is in its lowermost position in which it is in continuous contact with the gear 37 so that for each revolution of the carrier 19, the worm 35 will be driven. Accordingly, the worm wheel 49 will be rotated to advance the gears 47 and 13, and consequently shaft 11, further in the same direction as the rotation induced by shaft 25 and described above. Thus the shaft 11 will rotate at a greater speed than shaft 25. This is true regardless of the direction of rotation of shaft 25 because the direction of rotation of worm gear 35 changes with that of shaft 25.

As the adjustment shaft 67 is rotated, the yoke 57 is raised and the portion of the ring gear 70 adjacent the follower 63 is lifted to remove some of the teeth from contact with the gear 37. The result of this is that the gear 37 will not be rotated continuously but will stop for a portion of each rotation of the carrier. The worm 35, and consequently shaft 11, will be advanced to a lesser degree than when gears 70 and 37 are in full contact.

This effect increases as the cam is turned farther until the ring gear is lifted clear of gear 37, in which case the speed ratio of shafts 25 and 11 will be 1 to 1.

When the gear 37 is out of contact with gear 70, the drive between shafts 25 and 11 will not be interrupted because the worm gear cannot drive the worm 35.

To prevent the gear 37 and its associated gear train from coasting ahead when contact between gears 37 and 70 is interrupted, the brake 85, 87, 89 is provided. This tendency to coast is noted only at higher speeds. As the speed of the carrier increases, the centrifugal force acting on weight 87 increases and urges the braking projections 89 into contact with gear 37 with increasing force. This brake effectively prevents coasting of these parts and maintains the accuracy of the device.

At slow speeds, the brake lugs will be withdrawn from contact with the gear 37 because the center of gravity of the weight 87 is to the left of shaft 83 in the braking position, and therefore, as soon as the product of weight and its lever arm exceeds the product of centrifugal force and its lever arm, the brake lugs will be withdrawn by the counter-clockwise tilting of the yoke on the pin 83 (Fig. 1).

Springs 61 and 71 hold the yoke 57 on the shaft 55 and the follower 63 on the cam 69.

The pointer 73 and indicator plate 79 serve to indicate the setting of the cam. Plate 79 may be calibrated in terms of A. P. I. units or specific gravity, if desired, so that compensation for temperature of various liquids may be had.

If desired, the shaft 67 may be actuated directly by a thermostat or by a ratio changing mechanism which is actuated by a thermostat so as to permit adjustment for both temperature and coefficient of expansion of the liquid being measured. In some cases, for instance where the device is used simply for calibrating a meter and register, the indicator plate 79 and pointer may be omitted entirely.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a change speed mechanism the combination of a driving shaft, a driven shaft, a carrier connected to said driving shaft, a worm mounted on said carrier, a worm wheel mounted on said carrier and in mesh with said worm, means for connecting said worm wheel to drive said driven shaft, a gear connected to drive said worm, a ring gear adapted to mesh with said worm driving gear, and means mounting said ring gear for adjustment to any one of a plurality of positions, said mounting means being constructed and arranged to interpose a different number of teeth of said ring gear in the path of the worm driving gear for each position of said ring gear.

2. In a change speed mechanism the combination of a driving shaft, a driven shaft, a carrier connected to said driving shaft, a worm mounted on said carrier, a worm wheel mounted on said carrier and in mesh with said worm, means for connecting said worm wheel to drive said driven shaft, a gear connected to drive said worm gear, a ring gear mounted for meshing engagement with said worm driving gear, and means pivotally mounting said ring gear for tilting, with respect to said worm driving gear, to withdraw said ring gear from meshing engagement with said worm driving gear.

3. In a change speed mechanism the combination of a driving shaft, a driven shaft, a carrier connected to said driving shaft, a worm mounted on said carrier, a worm wheel mounted on said carrier and in mesh with said worm, means for connecting said worm wheel to drive said driven shaft, a gear connected to drive said worm gear, a ring gear mounted for meshing engagement with said worm driving gear, means pivotally mounting said ring gear for tilting, with respect to said worm driving gear, to withdraw said ring gear from meshing engagement with said worm driving gear, and adjustable means for variably tilting said ring gear to vary the amount of driving engagement with said worm driving gear.

4. In a change speed mechanism the combination of a driving shaft, a driven shaft, a carrier connected to said driving shaft, a worm mounted on said carrier, a worm wheel mounted on said carrier and in mesh with said worm, means for connecting said worm wheel to drive said driven shaft, a gear connected to drive said worm gear, a ring gear mounted for meshing engagement with said worm driving gear, means pivotally mounting said ring gear for tilting, with respect to said worm driving gear, to withdraw said ring gear from meshing engagement with said worm driving gear, said adjustable means including a cam adapted to support said ring gear, and yieldable means for holding said ring gear in contact with said worm driving gear.

5. In a change speed mechanism the combination of a driving shaft, a driven shaft, a carrier connected to said driving shaft, a worm mounted on said carrier, a worm wheel mounted on said carrier and in mesh with said worm, means for connecting said worm wheel to drive said driven shaft, a gear connected to drive said worm gear, a ring gear mounted for meshing engagement with said worm driving gear, means pivotally mounting said ring gear for tilting, with respect to said worm driving gear, to withdraw said ring gear from meshing engagement with said worm driving gear, and means for yieldably holding said ring gear in position to engage said worm driving gear.

6. In a change speed mechanism the combination of a driving shaft, a driven shaft, a carrier connected to said driving shaft, a worm mounted on said carrier, a worm wheel mounted on said carrier and in mesh with said worm, means for connecting said worm wheel to drive said driven shaft, adjustable variable speed means for driving said worm to vary the speed relation of said driving and driven shafts, and braking means comprising a centrifugal weight for braking said worm.

7. In a change speed mechanism the combination of a driving shaft, a driven shaft, a carrier connected to said driving shaft, a worm mounted on said carrier, a worm wheel mounted on said carrier and in mesh with said worm, means for connecting said worm wheel to drive said driven shaft, adjustable variable speed means for driving said worm to vary the speed relation of said driving and driven shafts, and braking means comprising a centrifugal weight for braking said worm, said braking means being constructed and arranged to be applied only when a predetermined speed of said carrier is reached.

8. In a change speed mechanism the combination of a driving shaft, a driven shaft, a carrier connected to said driving shaft, a worm mounted on said carrier, a worm wheel mounted on said carrier and in mesh with said worm, means for connecting said worm wheel to drive said driven shaft, a gear connected to drive said worm, a ring gear adapted to mesh with said worm driving gear, a brake mounted on said carrier and adapted to engage said worm driving wheel, and a weight connected to actuate said brake, said weight being mounted to be actuated by centrifugal force.

9. In a change speed mechanism the combination of a driving shaft, a driven shaft, a carrier connected to said driving shaft, a worm mounted on said carrier, a worm wheel mounted on said carrier and in mesh with said worm, a gear carried by said worm wheel, a shaft gear connected with said driven shaft and in mesh with said first named gear, a gear connected to drive said worm, a yoke mounted for pivoting to various positions, a ring gear mounted on said yoke and adapted to mesh with and drive said worm drive gear, the distance which said worm drive gear is driven depending upon the pivotal position occupied by said ring gear, and means for holding said yoke and said ring gear in any one of a plurality of pivoted positions.

10. In a change speed mechanism the combination of a driving shaft, a driven shaft, a carrier connected to said driving shaft, a worm mounted on said carrier, a worm wheel mounted on said carrier and in mesh with said worm, a gear carried by said worm wheel, a shaft gear connected with said driven shaft and in mesh with said first named gear, a gear connected to drive said worm, a yoke mounted for pivoting to various positions, a ring gear mounted on said yoke and adapted to mesh with and drive said worm drive gear, the distance which said worm drive gear is driven depending upon the pivotal position occupied by said ring gear, means for holding said yoke and said ring gear in any one of a plurality of pivoted positions, and a brake pivotally mounted on said carrier and adapted to functionally engage said worm driving gear, said brake being applied by centrifugal force.

RALPH B. PRESSLER.